(12) United States Patent
Barber

(10) Patent No.: US 7,787,999 B1
(45) Date of Patent: Aug. 31, 2010

(54) INCREASING PILOT SITUATIONAL AWARENESS OF FLIGHT MANAGEMENT SYSTEM PARAMETERS, TARGETS AND INTENT

(75) Inventor: Sarah Barber, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 879 days.

(21) Appl. No.: 11/211,891

(22) Filed: Aug. 25, 2005

(51) Int. Cl.
*G06F 7/00* (2006.01)
(52) U.S. Cl. .................. 701/14; 340/988; 340/992; 340/995.14
(58) Field of Classification Search ............ 700/14; 340/988–994, 995.1–996
See application file for complete search history.

(56) References Cited

U.S. PATENT DOCUMENTS

| | | | | |
|---|---|---|---|---|
| 5,978,715 A * | 11/1999 | Briffe et al. | .................. | 701/11 |
| 6,038,498 A * | 3/2000 | Briffe et al. | .................. | 701/3 |
| 6,085,129 A * | 7/2000 | Schardt et al. | .................. | 701/14 |
| 6,112,141 A * | 8/2000 | Briffe et al. | .................. | 701/14 |
| 6,154,151 A * | 11/2000 | McElreath et al. | .................. | 340/970 |
| 6,389,355 B1 * | 5/2002 | Gibbs et al. | .................. | 701/206 |
| 6,449,556 B1 * | 9/2002 | Pauly | .................. | 701/206 |
| 6,466,235 B1 * | 10/2002 | Smith et al. | .................. | 715/771 |
| 6,512,527 B1 | 1/2003 | Barber et al. | .................. | 345/764 |
| 6,593,858 B2 * | 7/2003 | Qureshi | .................. | 340/976 |
| 6,690,298 B1 | 2/2004 | Barber et al. | .................. | 340/971 |
| 6,707,475 B1 * | 3/2004 | Snyder | .................. | 715/771 |
| 6,744,382 B1 * | 6/2004 | Lapis et al. | .................. | 340/971 |
| 6,799,095 B1 | 9/2004 | Owen et al. | .................. | 701/4 |
| 6,934,608 B2 * | 8/2005 | Qureshi | .................. | 701/4 |
| 7,188,007 B2 * | 3/2007 | Boorman et al. | .................. | 701/3 |
| 7,256,710 B2 * | 8/2007 | Mumaw et al. | .................. | 340/973 |
| 7,363,119 B2 * | 4/2008 | Griffin et al. | .................. | 701/3 |
| 2006/0005147 A1 * | 1/2006 | Hammack et al. | .................. | 715/805 |
| 2007/0132572 A1 * | 6/2007 | Itoh et al. | .................. | 340/462 |

* cited by examiner

*Primary Examiner*—Khoi Tran
*Assistant Examiner*—Nikhil Sriraman
(74) *Attorney, Agent, or Firm*—Matthew J. Evans; Daniel M. Barbieri

(57) ABSTRACT

A method of displaying flight management system (FMS) data, and an avionics system configured to implement the method, are provided. The method includes the step of providing FMS route data. The method also includes the step of using the FMS route data to display an FMS intent strip which represents current maneuvering intent of the FMS.

10 Claims, 5 Drawing Sheets

INCREASING PILOT SITUATIONAL AWARENESS OF FLIGHT MANAGEMENT SYSTEM PARAMETERS, TARGETS AND INTENT

BACKGROUND

Disclosed embodiments relate generally to flight management systems (FMS's). More particularly, disclosed embodiments relate to display of FMS information.

The discussion below is merely provided for general background information and is not intended to be used as an aid in determining the scope of the claimed subject matter.

In an avionics system, flight plans are entered into the FMS. The FMS can then be used to provide maneuvering instructions to both a pilot and to an autopilot system. Traditionally, when flying using FMS navigation, the pilot flying the aircraft has to refer to one or more control display unit (CDU) pages to obtain information concerning current performance parameters (e.g., target climb speed), navigation targets/constraints (e.g., altitude/speed constraints), and routing. Having to access these pages can distract the pilot from monitoring other important systems and aircraft functions.

Additionally, it is often difficult for the pilot to understand what the FMS is currently doing, in the way of maneuvering, to capture lateral and vertical targets, and to predict what it will do when sequencing past the next waypoint. All too often, the phrase "what is it doing now?" could be used to describe the pilot's state of mind regarding what the FMS is doing, or instructing the pilot to do, to control maneuvering to capture the lateral and vertical targets. This lack of understanding of FMS maneuvering intent indicates a loss of situational awareness of FMS operation and intent. In aviation, maintaining or improving pilot situational awareness is very important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some disclosed embodiments utilize the advent of large format displays to provide a "window" into the flight management system (FMS), which provides the pilot with all information pertinent to the current phase-of-flight. The information can be presented in a heads-forward location, within normal visual scan, thus enhancing the pilot's ability to assimilate the information and stay or remain aware of current FMS parameters. An FMS intent strip, or briefing strip, is included for the airborne flight phases. The strip provides the pilot with information about what the FMS is currently doing in the way of maneuvering. In some embodiments, an FMS future intent strip, or future briefing strip, is provided to inform the pilot what the FMS will do at the next waypoint. Various illustrative embodiments of the FMS intent strip, and the optional FMS future intent strip, are described in the Detailed Description provided below in the context of examples.

BRIEF DESCRIPTION OF THE DRAWINGS

FIGS. 2-1 is a diagrammatic illustration of FMS intent strips which represent maneuvering intent of the FMS.

FIGS. 2-2 is a diagrammatic illustration of various lateral navigation icons and vertical navigation icons.

DETAILED DESCRIPTION

Figure 1:
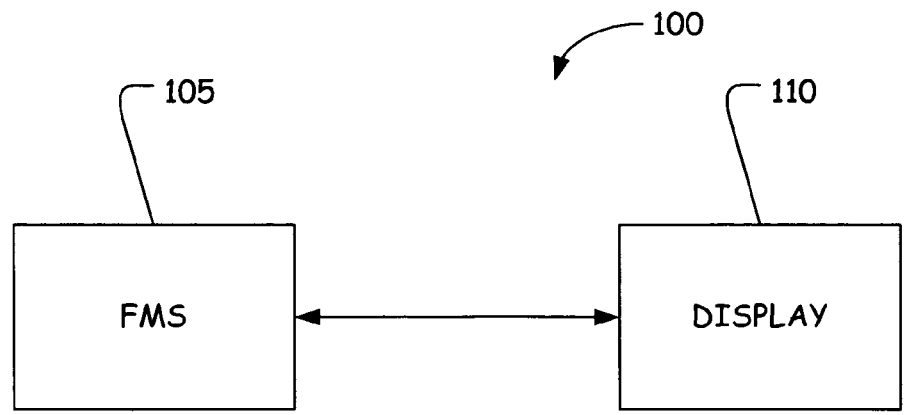
FIG. 1 is a block diagram illustrating an avionics system including a flight management system (FMS) and a display device.
Figures 1, 2:
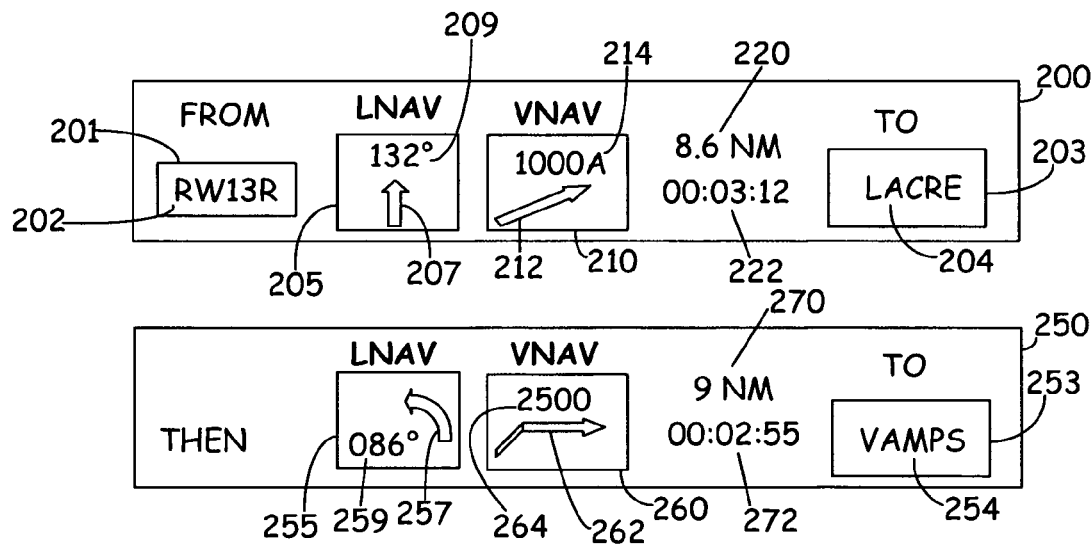
Figure 2:
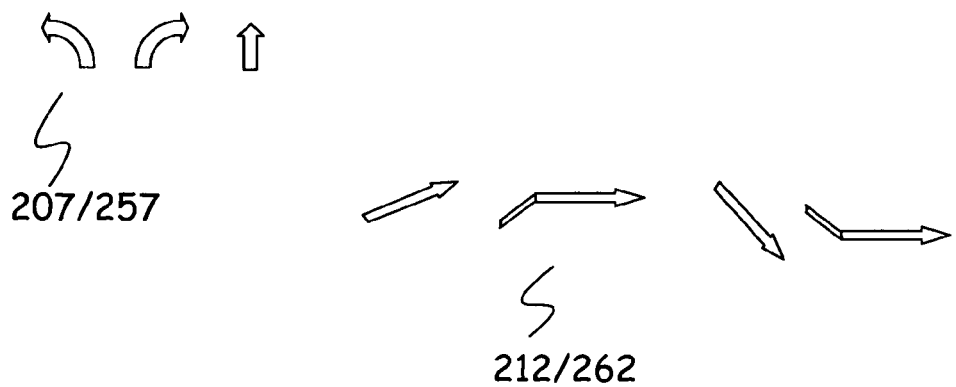

FIG. 1 is a block diagram illustrating two components of an avionics system 100 for an aircraft. In this example, avionics system 100 includes an FMS 105 and a display device 110. The display device can be any desired type of display device, such as a control data unit (CDU), a multi-function display (MFD), a dedicated FMS display, etc. As noted above, in some exemplary embodiments, display device 110 is positioned in a heads-forward location relative to the pilot, but this need not be the case in all embodiments. FMS 105 provides a source of FMS data. Display device 110 is configured to use the FMS data to display an FMS intent strip 200 as shown in FIG. 2-1. If desired, display device 110 can also be configured to display FMS future intent strip 250 as well.

Referring to FIGS. 2-1, a discussion is provided of various features which can be included in FMS intent strip 200 and FMS future intent strip 250 in example embodiments. Referring first to FMS intent strip 200, included in this briefing strip is a FROM waypoint window 201 which contains an identification (ID) 202 of the last waypoint, which is the waypoint previously achieved by the aircraft and the beginning of the current flight leg or segment. Also included is a TO waypoint window 203 which contains an ID 204 of the next waypoint, which is the end waypoint of the current flight leg or segment. It must be noted that, while waypoint IDs 202 and 204 are shown as being displayed in a waypoint window, these IDs can in other embodiments be displayed outside of a window.

In exemplary embodiments as illustrated in FIGS. 2-1, FMS intent strip 200 includes a lateral navigation (LNAV) window 205 and a vertical navigation (VNAV) window 210. Lateral navigation window 205 includes a lateral navigation icon (or other graphical representation) 207. The lateral navigation icon 207 graphically represents current lateral maneuvering intent of the FMS. For example, lateral navigation icon 207 can use different arrow types to represent FMS lateral maneuvering intent to turn left, turn right or maintain a current heading. In exemplary disclosed embodiments, lateral navigation window 205 also includes lateral numeric data 209, displayed adjacent to lateral navigation icon 207, which numerically represents current lateral maneuvering intent of the FMS. In the particular example illustrated in FIGS. 2-1, lateral navigation icon 207 and lateral numeric data 209 graphically inform the pilot of the FMS intent to continue a straight ahead heading of 132°. This current lateral navigation maneuvering intent is to be completed between waypoint RW13R and waypoint LACRE, as indicated by FROM and TO waypoint IDs 202 and 204. While lateral navigation icon 207 and lateral numeric data 209 are represented as being displayed within a lateral navigation window 205, in other embodiments, lateral navigation window 205 is optional, and lateral navigation icon 207 and lateral numeric data 209 can be displayed elsewhere within intent strip 200.

Also in the embodiment of intent strip 200 shown in FIGS. 2-1 is vertical navigation window 210 which contains a vertical navigation icon 212 and vertical numeric data 214. Vertical navigation icon 212 graphically represents current vertical maneuvering intent of the FMS. For example, vertical navigation icon 212 can include graphical representations of current FMS vertical maneuvering intent to climb, descend, level off, maintain an "at constraint" altitude, and/or combinations of these maneuvering intents. Vertical numeric data 214 displayed adjacent to the vertical navigation icon 212 numerically represents current vertical maneuvering intent of the FMS. In the example embodiment shown in FIGS. 2-1, vertical navigation window 210 includes a vertical navigation icon 212 and numeric data 214 which indicate that the current FMS intent is for the aircraft to climb (i.e., represented using the upwardly inclined arrow) to an altitude of 1,000 feet by the time the aircraft reaches waypoint LACRE. Also included in current FMS intent strip 200 are time indicator 222 and distance indicator 220 which represent the time and distance to the next waypoint, in this example waypoint LACRE.

Optionally, in exemplary embodiments, display device 110 shown in FIG. 1 is further configured to display FMS future intent strip 250. Future intent strip 250 can include the same or similar features as included in current intent strip 200, but for the flight segment between the next waypoint (LACRE represented at 204) and the subsequent waypoint (VAMPS as represented by ID 254 of TO waypoint window 253). For example as shown in FIGS. 2-1, future intent strip 250 includes lateral navigation window 255, which contains lateral navigation icon 257 and lateral numeric data 259. Future intent strip 250 also includes vertical navigation window 260 which contains, where appropriate, vertical navigation icon (or icon position) 262 and vertical numeric data 264. Future intent strip 250 also includes, as illustrated, indicators 272 and 270 showing respectively the time and distance to TO waypoint 254. In this example, future intent strip 250 indicates the FMS future LNAV intent to turn left to 086°, and the future VNAV intent to climb to and maintain an altitude of 2500 ft. This future intent strip is also represents to the pilot that the distance between next waypoint LACRE 204 and the subsequent waypoint VAMPS 254 is 9.2 nautical miles (NM), and will take two minutes and fifty-five seconds to travel. By providing FMS intent strip 200, and optionally by providing FMS future intent strip 250, the pilot will have an improved situational awareness regarding FMS intent.

Referring now to FIGS. 2-2, shown are examples of various lateral navigation icons 207/257 and vertical navigation icons 212/262. The illustrated lateral navigation icons 207/257 include, from left to right in FIGS. 2-1, a left turn icon, a right turn icon, and a straight ahead or maintain heading icon. The illustrated vertical navigation icons 212/262 include, from left to right, a climb icon, a climb and maintain an "at" constraint icon, a descend icon, and a descend and maintain an "at" constraint icon. These icons are provided for illustrative purposes, and those of skill in the art will recognize that other or additional icons can be used in different embodiments.

Figure 3:
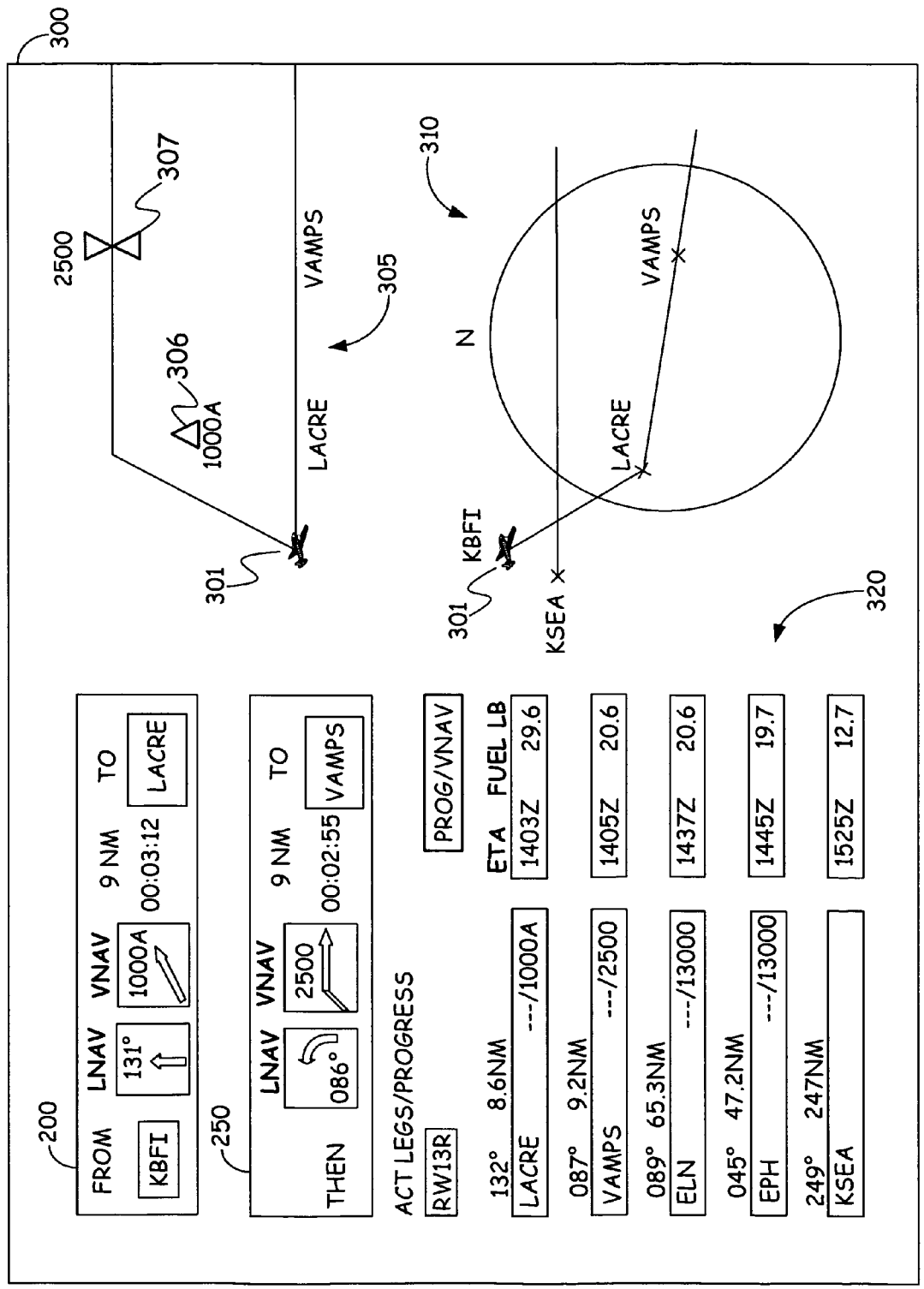
FIG. 3 is a diagrammatic illustration of a display device configured to display FMS intent strips.

Referring now to FIG. 3, shown is an example embodiment of a page 300 which can be displayed on display device 110. Page 300 illustrates intent strips 200 and 250 in relation to other displayed features in one example embodiment. In this example embodiment, intent strips 200 and 250 are displayed adjacent or proximate to one or more maps. For example, vertical navigation map 305 and lateral navigation map 310 are shown in FIG. 3. Aircraft position in each of maps 305 and 310 in FIG. 3 is represented by icon (or other graphical symbol) 301. Also shown in FIG. 3 is information 320 from a conventional LEGS page of the type frequently used to display FMS data relating to a current leg of a flight plan. Note that while LEGS page information 320 includes waypoint IDs and numeric data relating to FMS intent, it does not do so in a concise intent or briefing strip. It also does not do so in conjunction with an icon or other graphical representations of the lateral and/or vertical intent. Also, while maps such as map 305 may illustrate vertical navigation constraints, such as the "at or above" altitude constraint represented by symbol 306 and the "at" altitude constraint represented by symbol 307, it does not contain all of the information represented in an intent strip as described. Using intent strips 200 and 250, the pilot does not need to piece together the current and future intent of the FMS using information from LEGS page 320 and maps 305 and 310, but can instead visualize all of this information within the intent strips. It must be noted that LEGS page information 320 and maps 305 and 310 need not be included in page 300 in all embodiments. Likewise, in some embodiments, future intent strip 250 can be omitted as well.

In one example of operation of intent strips 200 and 250, the intent strips are controlled to function as follows to enhance the situational awareness of the pilot in regards to what the FMS is currently doing, or will do at the next waypoint. Reference numbers refer back to those shown in FIGS. 2-1, and represent the same features in the description of the remaining FIGS. After sequencing at waypoint KBFI, strip 200 displays KBFI as the FROM waypoint ID 202. Strip 200 also displays the required lateral turn direction (using icon 207) and course (using lateral numeric data 209). FMS intent strip 200 also displays the required vertical maneuver (using icon 212) and target altitude (using vertical numeric data 214). Intent strip 200 also displays the distance and time to the next waypoint (e.g., LACRE in FIG. 3) using indicators 220 and 222, as well as the TO waypoint ID 204. The FMS commands the aircraft (e.g., either via the autopilot or the pilot) to maneuver so as to satisfy these lateral and vertical requirements. Future intent strip 250 displays similar information for the next flight leg or segment. At a predetermined point (time, distance or maneuver-completion based), the future intent strip can change to indicate what the FMS intent is at the next waypoint transition. In some embodiments, during the takeoff phase of flight, only the current FMS intent strip 200 is visible to the pilot. In other embodiments, both intent strips are visible at all times.

Figure 4:
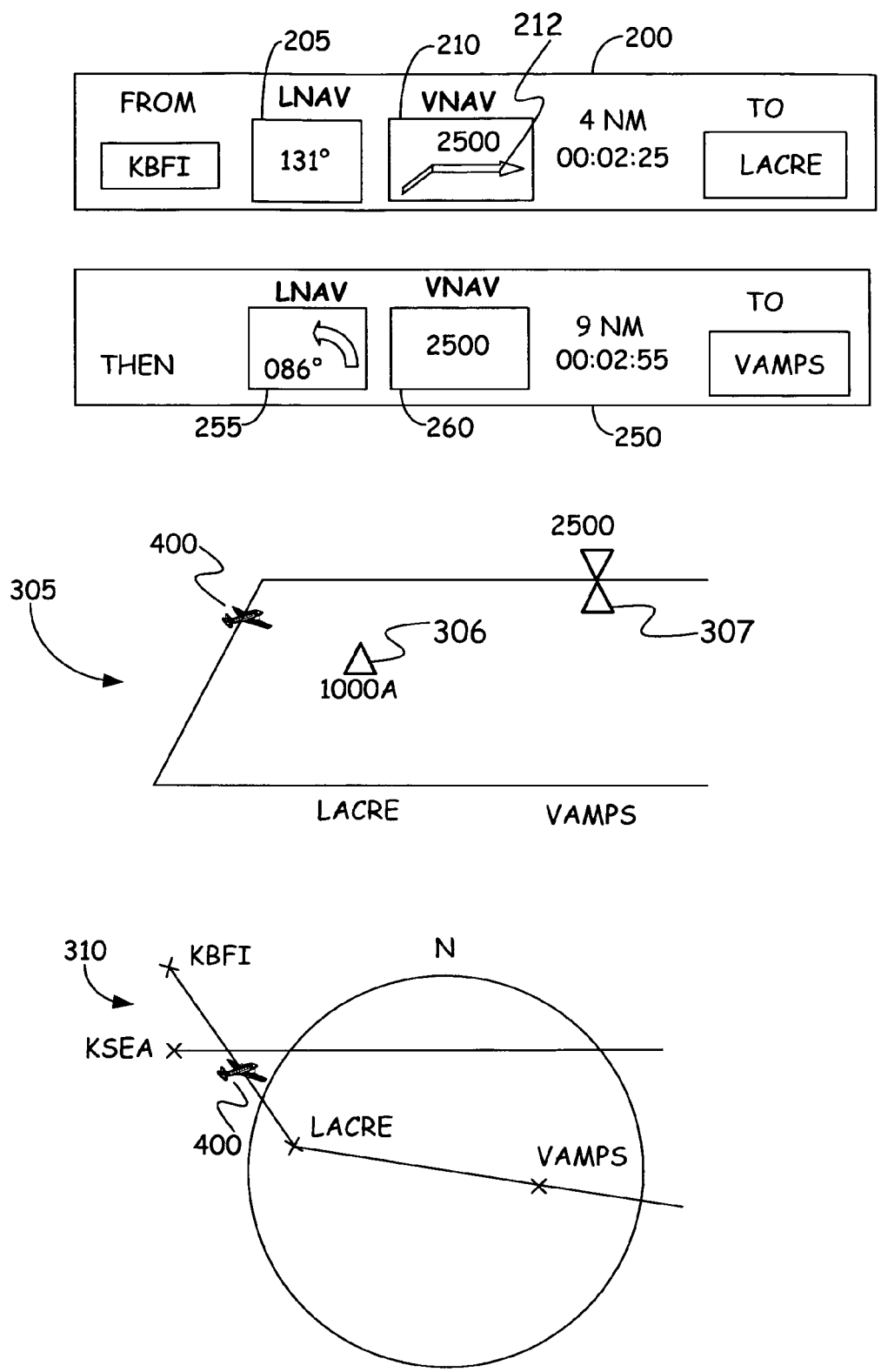
FIGS. 4 and 5 are diagrammatic illustrations of FMS intent strips, in conjunction with maps for current and future flight segments.

Referring now to FIG. 4, shown are intent strips 200 and 250 in conjunction with maps 305 and 310 during the same leg or segment of flight shown in FIGS. 2 and 3, but at a later point in time. At this later point and time, the aircraft is at a new position in the current flight segment as represented by the position of icons 400 shown in maps 305 and 310. Note the difference of position between icons 301 and 400 shown respectively in FIGS. 3 and 4.

Another example of intent strip functionality is shown in FIG. 4. After climbing to 1000 feet (satisfying the 1000 foot "at or above" altitude constraint for LACRE represented in FIGS. 2 and 3), the VNAV FMS function instructs that the aircraft continue to climb to the next "hard" constraint (e.g., 2500 feet at waypoint VAMPS). Thus, in vertical navigation window 210 as shown in FIG. 4, the vertical navigation icon 212 changes to represent the intention for the aircraft to climb to, and level-off at, 2500 feet. The change occurs even though this is a requirement of the next flight segment (beginning at waypoint LACRE). Further as illustrated in FIG. 4, as soon as the lateral navigation is established to be on course to the TO waypoint (LACRE in this example), the lateral navigation icon 207 can be removed, indicating that the maneuver is complete. This can include, for example, displaying a lateral turn icon until the lateral turn maneuver is complete, or displaying a maintain lateral course icon (e.g., as shown in FIGS. 2 and 3) for a short period before removing the icon. As can be seen in this example, the FMS current and future intent strips can also be dynamically changed as constraints are met and maneuvers are completed ahead of scheduled requirements. This includes both removing lateral navigation icons when a lateral turn maneuver is completed, and updating vertical navigation icons and numerical data when a vertical navigation constraint is met and/or when a vertical maneuver corresponding to the next flight segment is to be achieved in the current flight segment and ahead of its required completion in a subsequent flight segment.

Figure 5:
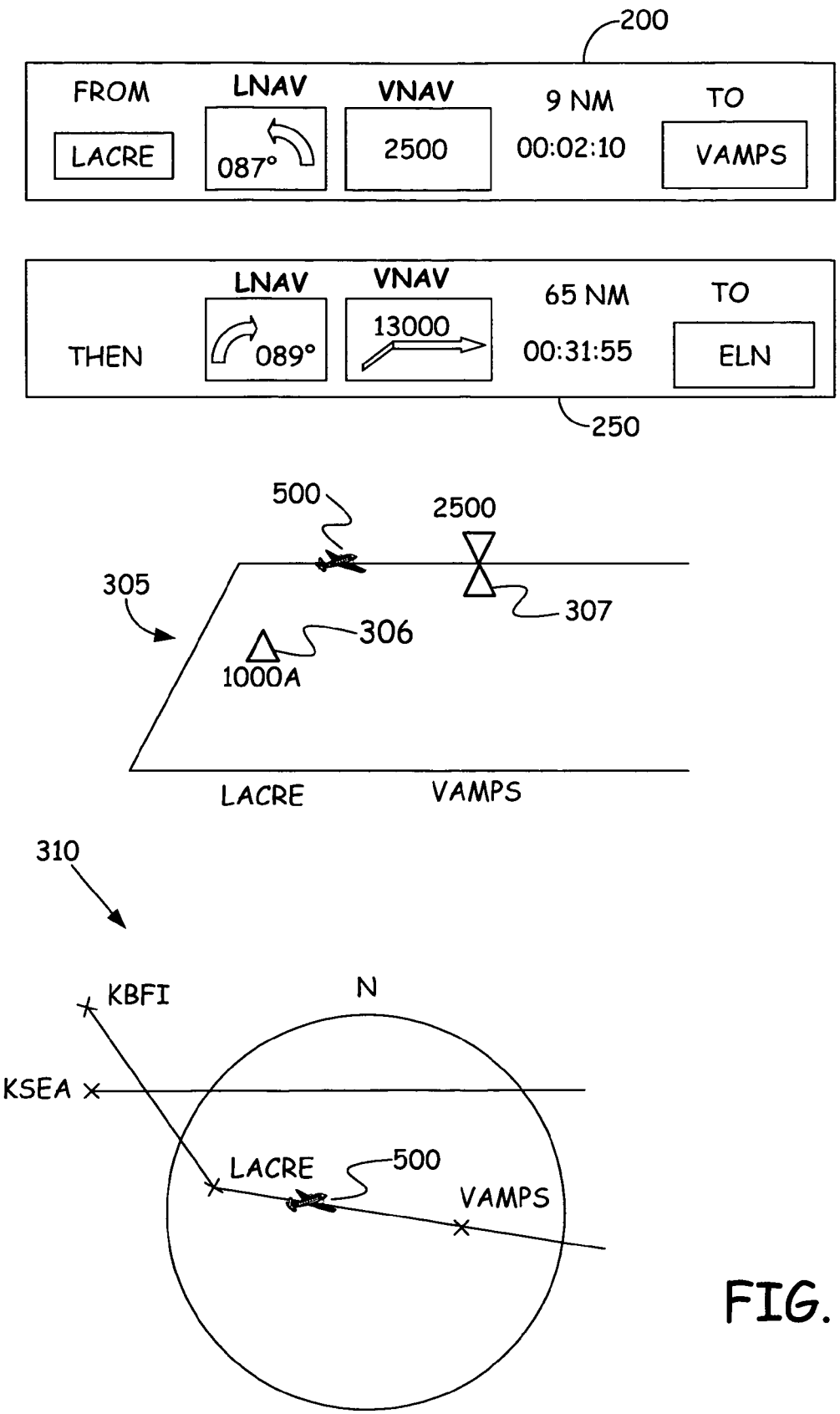

Referring now to FIG. 5, intent strips 200 and 250 are shown for an aircraft position 500 (referenced on maps 305 and 310) which occurs after sequencing at waypoint LACRE in this example. Upon sequencing at waypoint LACRE, intent or briefing strip 200 now indicates the next (now current) FMS maneuver. In this case, between waypoints LACRE and VAMPS, the aircraft is to turn left to 087°, while the altitude remains constant at 2500 feet due to the constraint at VAMPS represented in maps 305 by symbols 307. Future intent strip 205 is also updated to represented FMS intent between the new TO waypoint VAMPS, and the subsequent waypoint ELN. As can be seen in FIG. 5, FMS future intent strip 250 now represents to the pilot that after achieving waypoint VAMPS, the aircraft should turn right to a heading of 089°, as well as climb to 13000 feet before leveling off, by waypoint ELN.

Figure 6:
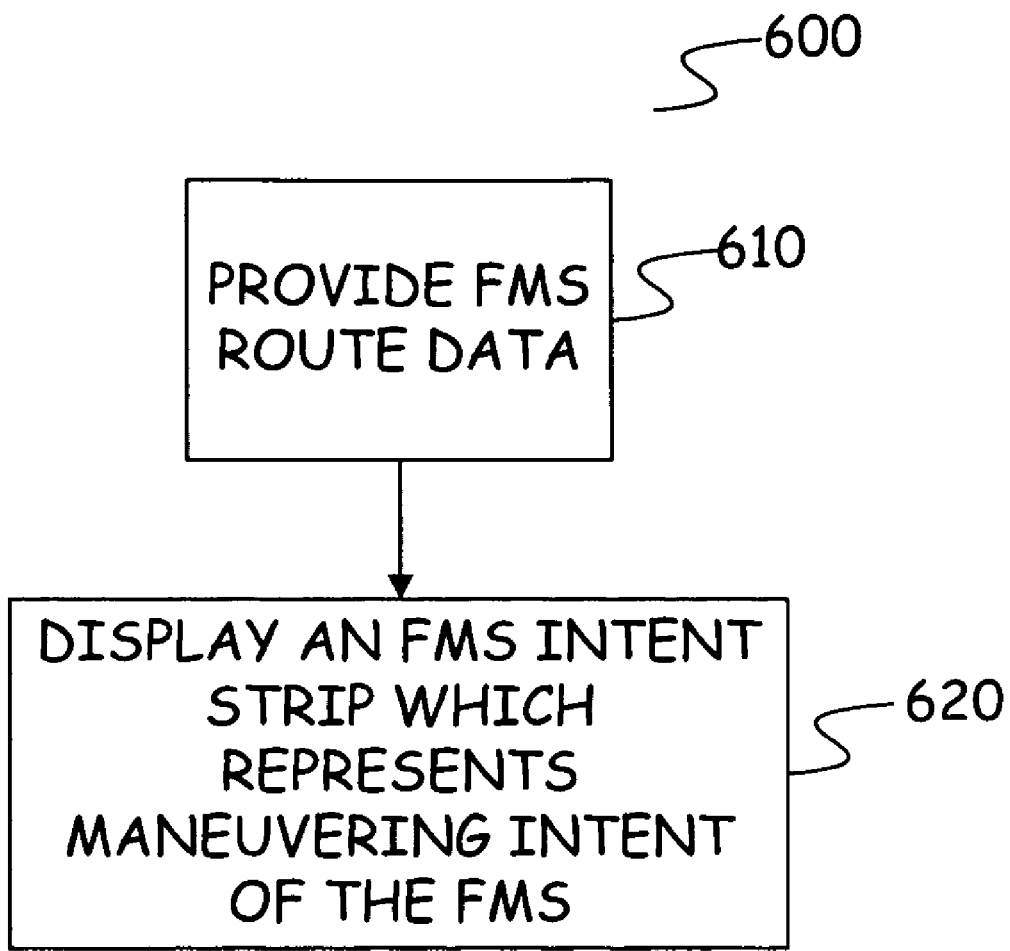
FIG. 6 is a flow diagram illustrating a method embodiment.

Referring now to FIG. 6, shown is a flow diagram 600 representing an embodiment of a method of displaying FMS data in accordance with the above description. As illustrated at block 610, the method is shown to include the step of providing FMS route data. This step can be implemented, for example, from the output of an FMS 105 shown in FIG. 1. Then, as shown at block 620, the method is shown to include the step of displaying an FMS intent strip which represents maneuvering intent of the FMS. As described above, this step can be implemented on any desired display device, and can include the display of just FMS intent strip 200, or a combination of FMS intent strip 200 and FMS future intent strip 250. The particular configuration of the FMS intent strips can vary for different embodiments and implementations. The description provided with reference to FIGS. 2-5 includes examples of more particular embodiments of step 620.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of displaying flight management system (FMS) data, the method comprising:
   providing FMS route data from an FMS to a single display device; and
   displaying, using the FMS route data, an FMS intent strip and a separate FMS future intent strip simultaneously on the single display device, the FMS intent strip representing to a pilot current maneuvering intent of the FMS and the separate FMS future intent strip representing to the pilot future maneuvering intent of the FMS for a next flight segment, wherein displaying the FMS intent strip comprises simultaneously displaying both a lateral navigation icon in a lateral navigation window of the FMS intent strip and a vertical navigation icon in a vertical navigation window of the FMS intent strip on the single display device, the lateral navigation icon in the FMS intent strip graphically representing current lateral maneuvering intent of the FMS and the vertical navigation icon in the FMS intent strip graphically representing current vertical maneuvering intent of the FMS, wherein displaying the FMS future intent strip comprises simultaneously displaying both a lateral navigation icon in a lateral navigation window of the FMS future intent strip and a vertical navigation icon in a vertical navigation window of the FMS future intent strip, the lateral navigation icon in the FMS future intent strip graphically representing future lateral maneuvering intent of the FMS for the next flight segment and the vertical navigation icon in the FMS future intent strip graphically representing future vertical maneuvering intent of the FMS for the next flight segment, and wherein displaying the FMS intent strip further comprises also simultaneously displaying, in the FMS intent strip on the single display device, FROM and TO waypoint IDs for a current flight segment, the FROM waypoint ID for the current flight segment being displayed in a separate FROM waypoint window of the FMS intent strip, and the TO waypoint for the current flight segment being displayed in a separate TO waypoint window of the FMS intent strip.

2. The method of claim 1, wherein the lateral navigation icon in the lateral navigation window of the FMS intent strip comprises an arrow which graphically represents current FMS lateral maneuvering intent to do one of turning left and turning right.

3. The method of claim 1, wherein displaying the FMS intent strip further comprises also simultaneously displaying lateral numerical data in the lateral navigation window of the FMS intent strip adjacent to the lateral navigation icon on the single display device, the lateral numerical data numerically representing current lateral maneuvering intent of the FMS.

4. The method of claim 1, wherein the vertical navigation icon in the vertical navigation window of the FMS intent strip graphically represents current FMS vertical maneuvering intent to do one of climbing, descending, leveling off, and maintaining an at constraint altitude.

5. The method of claim 1, wherein displaying the FMS intent strip further comprises also simultaneously displaying vertical numerical data in the vertical navigation window of the FMS intent strip adjacent to the vertical navigation icon on the single display device, the vertical numerical data numerically representing current vertical maneuvering intent of the FMS.

6. The method of claim 1, wherein displaying the FMS intent strip further comprises also simultaneously displaying, in the FMS intent strip on the single display device, time and distance from the TO waypoint of the current flight segment.

7. The method of claim 1, and further comprising also simultaneously displaying on the single display device a map adjacent the FMS intent strip and the FMS future intent strip.

8. An avionics system comprising:
   a source of flight management system (FMS) data; and
   a single display device configured to display an FMS intent strip, using the FMS data, which represents current maneuvering intent of the FMS for a current flight segment between a current FROM waypoint and a TO waypoint, wherein the single display device is configured to display the FMS intent strip by simultaneously displaying lateral and vertical navigation icons, in the FMS intent strip, which respectively graphically represent current lateral and vertical maneuvering intent of the FMS for the current flight segment, wherein the single display device is configured to simultaneously display in a lateral navigation window of the FMS intent strip both the lateral navigation icon and lateral numeric data which numerically represents current lateral maneuvering intent of the FMS, wherein the lateral navigation icon in the lateral navigation window of the FMS intent strip comprises an arrow which graphically represents current FMS lateral maneuvering intent to do one of turning left and turning right, and wherein the single display device is configured to simultaneously display in a separate vertical navigation window of the FMS intent strip both the vertical navigation icon and vertical numeric data which numerically represents current vertical maneuvering intent of the FMS, wherein the single display device is further configured to simultaneously display along with the FMS intent strip an FMS future intent strip, using the FMS data, which represents future maneuvering intent of the FMS for a next flight segment, wherein the single display device is configured to simultaneously display lateral and vertical navigation icons, respectively in lateral and vertical navigation windows of the FMS future intent strip, which respectively graphically represent future lateral and vertical maneuvering intent of the FMS for the next flight segment, wherein the display device is also configured to simultaneously display lateral and vertical numerical data, respectively in the lateral and vertical navigation windows of the FMS future intent strip, which numerically represent future lateral and vertical maneuvering intent of the FMS for the next flight segment.

9. The avionics system of claim 8, wherein the FMS intent strip and the FMS future intent strip simultaneously include FROM and TO waypoint IDs, respectively, for the current and next flight segments displayed on the single display device.

10. The avionics system of claim 9, wherein the FMS intent strip further simultaneously includes time and distance from the TO waypoint of the current flight segment, and wherein the FMS future intent strip further simultaneously includes time and distance between the FROM waypoint and the TO waypoint of the next flight segment.

* * * * *